Feb. 9, 1971   J. M. TRENARY ET AL   3,561,033
AUTOMATIC TOOTHBRUSH WITH MOTION SELECTOR
Filed May 6, 1969                                5 Sheets-Sheet 1

INVENTORS
John M. Trenary
David W. Smith
BY McGrew & Edwards
ATTORNEYS

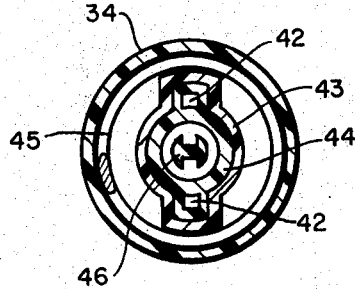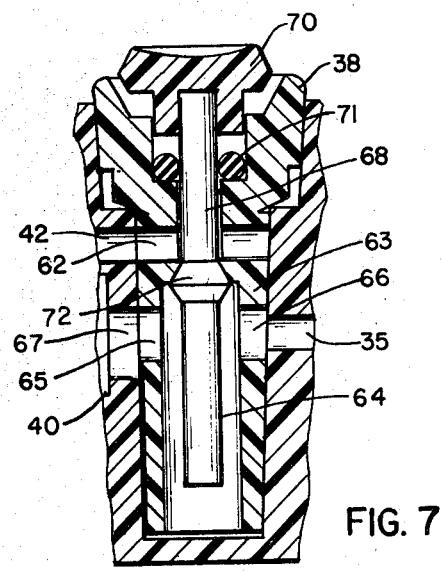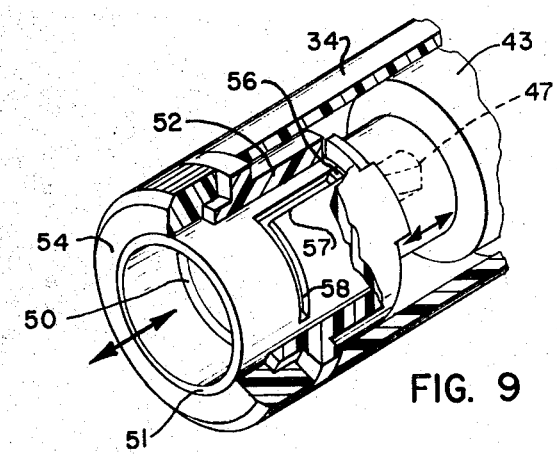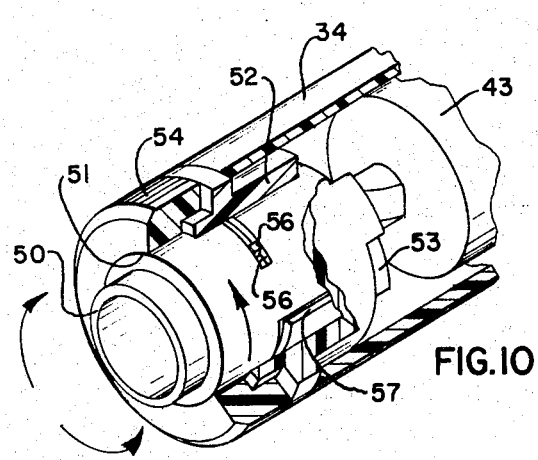

*INVENTOR.*
John M. Trenary
David W. Smith
BY
ATTORNEYS

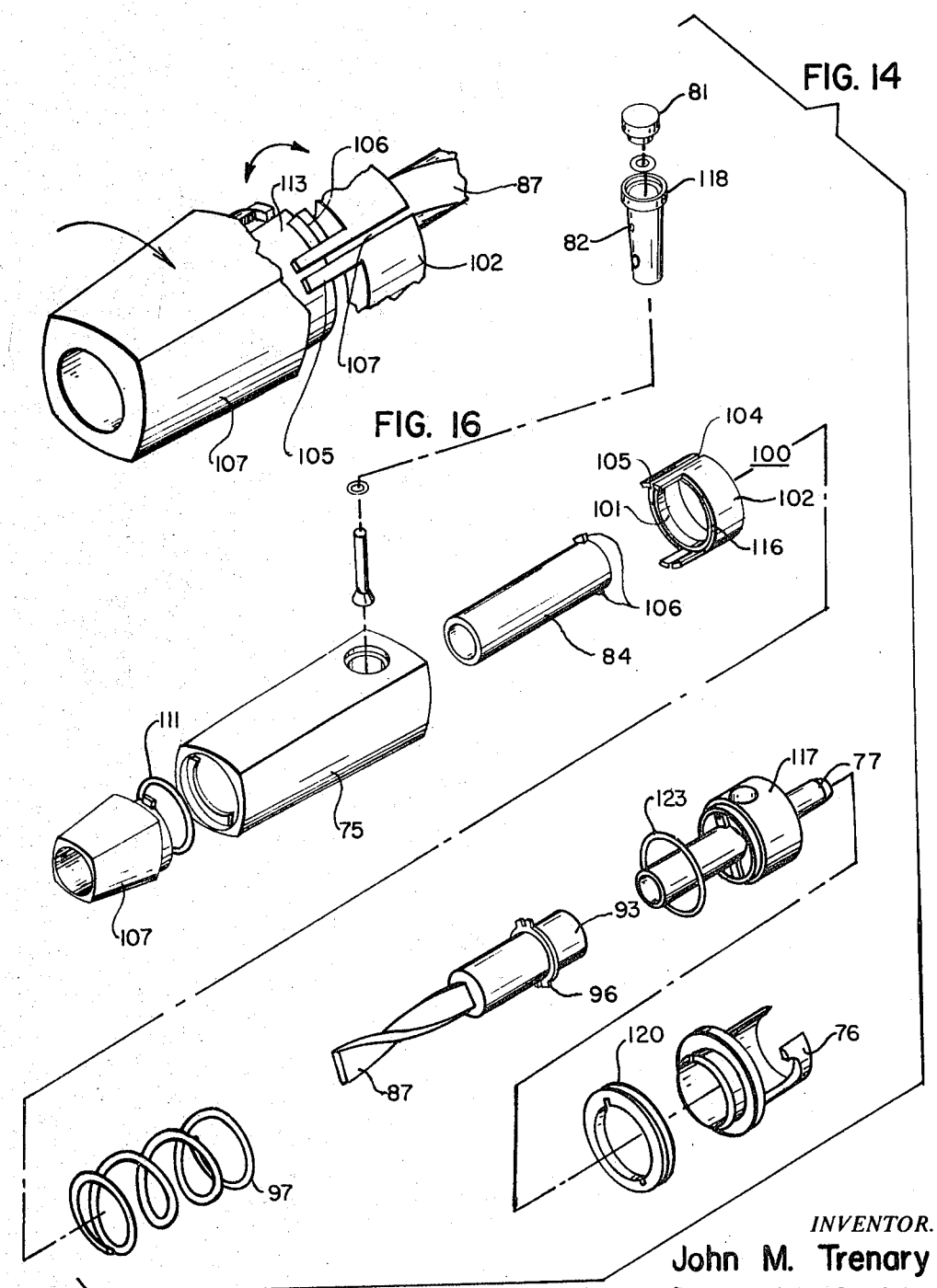

United States Patent Office 3,561,033
Patented Feb. 9, 1971

3,561,033
AUTOMATIC TOOTHBRUSH WITH MOTION
SELECTOR
John M. Trenary, Fort Collins, and David W. Smith,
Wellington, Colo., assignors to Aqua Tec Corporation,
Fort Collins, Colo., a corporation of California
Filed May 6, 1969, Ser. No. 822,181
Int. Cl. A46b 13/06; A47k 7/04
U.S. Cl. 15—22                                10 Claims

ABSTRACT OF THE DISCLOSURE

An automatic toothbrush comprises a handle provided with a detachable toothbrush element and a reciprocating motor in the handle for driving the toothbrush. Reciprocating motion is effected by direct drive between the motor and the toothbrush and rotary oscillating motion is effected by a helical member connecting the reciprocating motor and the rotatable drive for the toothbrush. A selector device is provided for alternatively connecting the motor and toothbrush to effect reciprocating movement of the brush in one position and rotary oscillating movement in the other.

This invention relates to motor driven toothbrushes and particularly to an improved motor driven toothbrush having an arrangement for selecting either reciprocating or oscillating motion of the brush.

Motor driven toothbrushes have been provided heretofore which provide various kinds of motion of the brush. These devices include arrangements for reciprocating the brush, for rotating the brush and for providing rotary oscillating movement of the brush. The particular type of motion to be employed is determined by various factors including the preference of the user and the desirability of using one type of motion for the sides of the teeth and another type for the chewing surfaces; the type of motion to be employed is often recommended by the user's dentist. It is desirable to provide for the ready availability of more than one type of motion and, accordingly, it is an object of the present invention to provide an improved motor driven toothbrush including an arrangement for readily selecting either of two types of motion of the brush.

It is another object of this invention to provide a motor driven toothbrush including an improved arrangement for connecting the brush to be driven by the motor alternatively with reciprocating and oscillating motion.

It is another object of this invention to provide a motor driven toothbrush of simple and rugged construction including a positive and simple control for selecting either reciprocating or oscillating movement of the brush.

It is a further object of this invention to provide an improved motor driven toothbrush including an arrangement for changing the drive of the brush from oscillating to reciprocating motion without stopping the driving motor.

Briefly, in carrying out the objects of this invention in one embodiment thereof, an automatic motor driven toothbrush is constructed for actuation by a hydraulic motor powered by a pulsating stream of liquid. The motor drives a reciprocating member on which is mounted a helical shaft and a sleeve is arranged about the shaft for either reciprocating or rotary movement. The motor and driving mechanism for the toothbrush are arranged in a handle of small and convenient size and the sleeve is arranged to receive the shaft of a toothbrush and to drive the brush depending upon the type of connection effected between the sleeve and the motor. The sleeve is provided with an end opening engaging the helical shaft and a control member is provided which in one position restrains the sleeve for reciprocating movement and in a second position restrains the sleeve for rotary movement. The restraining means on the selector comprises guide slots one a straight slot extending longitudinally and the other an arcuate slot extending at right angles thereto. These slots are in communication with one another and a lug on the sleeve rides in either one or the other of the slots. The arcuate slot is positioned at the outer end of the longitudinal slot and the selector is a rotatable member movable between two positions, in the first position, the lug of the sleeve rides in the longitudinal slot with reciprocating motion and for the second position the selector is twisted an the sleeve rotates with respect to the helical member and moves upwardly until the lug engages the arcuate slot. It is unnecessary to stop the motor for purposes of shifting the control from one position to the other. Stops or retainers are provided for holding the selector in either of its positions. In another embodiment of the invention the construction is similar to that of the first embodiment however the selector mechanism is provided so that the arcuate slot lies at the end of the longitudinal slot toward the motor and the sleeve lug when inactive is positioned adjacent the arcuate slot and moves either in the arcuate slot or in the longitudinal slot depending upon the position of the selector when the motor is actuated.

The features of novelty which characterize this invention are pointed out with particularity in the claims annexed to and forming a part of this specification. The invention itself, however, both as to its organization and its method of operation, together with further objects and advantages thereof, will best be understood upon reference to the following description taken in connection with the accompanying drawings in which:

FIG. 6 is a sectional view taken along the line 6—6 of FIG. 3;

FIG. 7 is an enlarged sectional view of the control valve assembly of the unit of FIG. 3;

FIG. 9 is an enlarged view partly broken away and partly in section illustrating the reciprocating drive position of the parts of the toothbrush assembly;

FIG. 10 is a view similar to FIG. 9 illustrating the rotary oscillating position of the parts of the assembly of FIG. 3;

FIG. 14 is an exploded view illustrating the pars of the assembly of the unit of FIG. 11;

FIG. 16 is a view similar to FIG. 15 illustrating the rotary oscillating position of the parts of the assembly of FIG. 11.

Figure 1:
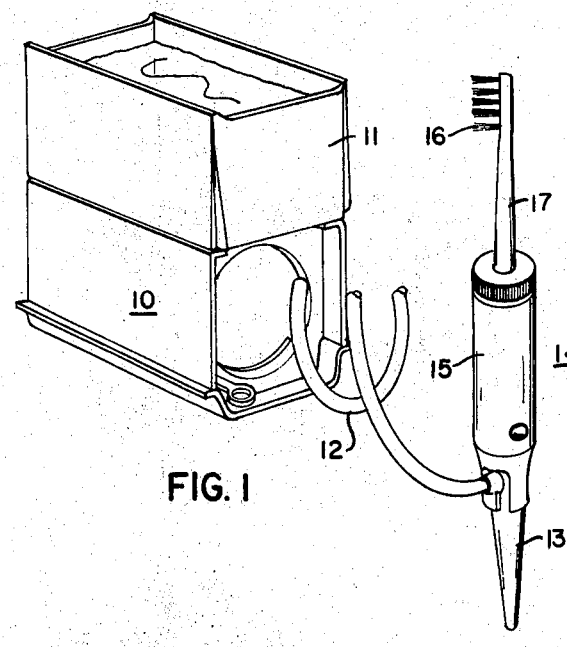
FIG. 1 is a perspective view of an oral hygiene appliance of the pulsed water jet type arranged to drive an automatic toothbrush embodying the invention.

Referring now to the drawings, FIG. 1 illustrates an oral hygiene appliance 10 provided with a detachable reservoir 11 for containing a quantity of water to be circulated by a motor driven pump within the unit 10 and to be delivered through a flexible tubing 12 to an output fixture 13. A motor driven toothbrush 14 combining the present invention has been shown attached to the fixture 13 the toothbrush 14 comprising a handle 15 constituting the housing for the motor and driving mechanism and a detachable toothbrush 16 having a shaft 17 attached to the driving mechanism. The oral hygiene appliance 10 is of the type which produces a pulsed stream of water comprising intermittent slugs of water. This appliance may be operated at a rate which by way of example produces spaced pulses of water at frequencies ranging from 800 to 1600 cycles per minute.

Figure 2:
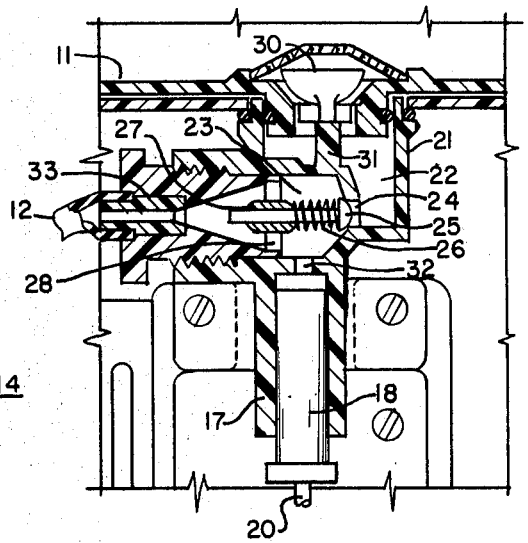
FIG. 2 is an enlarged sectional view showing the construction of the liquid pump of the appliance of FIG. 1.

The manner in which the pulsed stream is produced will be apparent from a consideration of FIG. 2 which illustrates a pump assembly comprising a cylinder 17 having a piston 18 mounted therein for reciprocation through a suitable driving mechanism connected to the piston through a rod 20. The pump assembly includes a substantially cylindrical wall 21 forming an inlet chamber 22. The pump includes a combined intake and discharge chamber 23 to which water is admitted from the chamber 22 through a port 24. An inlet valve 25 is urged by a spring 26 toward its position closing the port 24. This valve is mounted in an elongated bushing 27 forming the hub of a spider 28 which comprises spokes around which the water may flow in moving from the right toward the left in the chamber 23. A valve 30 in the bottom of the reservoir 11 is raised and opened by engagement with a post 31 formed on the pump structure within the inlet chamber 22 and admits water to the inlet chamber. When the piston 18 is reciprocated it draws water in through the port 24 the valve 25 being opened during its down stroke and the water flowing to the piston chamber through a port 32. On its return stroke the pump discharges water into the chamber 23 the inlet valve closes and the water flows out through a port 33 into the tubing 12. The construction of this pump is essentially the same as that disclosed in United States Letters Patent No. 3,393,673 Mattingly assigned to the same assignee as the present invention.

Figure 3:
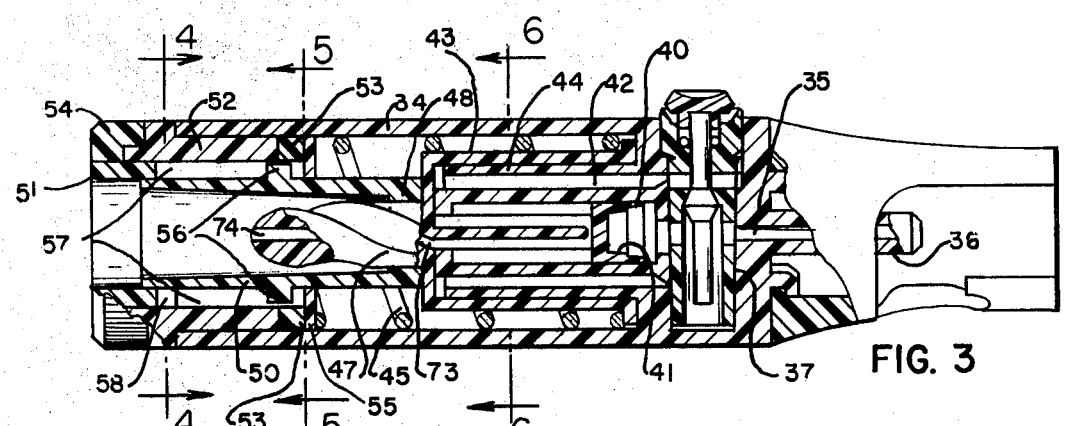
FIG. 3 is a longitudinal sectional view of the motor unit of the toothbrush of FIG. 1.
Figure 4:
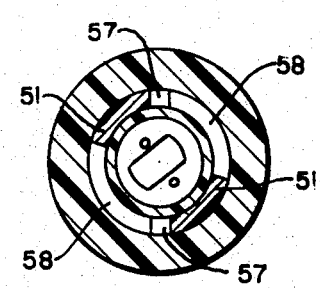
FIG. 4 is a sectional view taken along the line 4—4 of FIG. 3.

The toothbrush motor assembly 15 as illustrated in FIGS. 3 through 7 comprises a cylindrical housing 34 closed at its right end and having an inlet port 35 in direct communication with a nipple 36 of a size and configuration to receive the fixeure 13 so that the pulsed stream of water from the appliance 10 will be discharged into the housing 34. A generally cylindrical slightly tapered bore 37 is provided near the inlet 35 and a valve assembly 38 is fitted into this opening to control the flow of fluid so that it passes either directly to a cylinder 40 to exert its pressure against a piston 41 therein or through a bypass passage 42 to the interior of the cylinder 40 on the other side of the piston 41. This bypass is provided in order to prime the motor in the event that air is present when the pulse stream is supplied to it. The motor comprises the piston 41 which is spring biased to the right as described below so that it is in its minimum volume position in the cylinder 40. A power transmitting member 43 is slidably mounted on the outer walls of the block 44 in which the cylinder 40 is formed. The member 43 is biased to the right by a compression spring 45 and engages the free floating piston 41 through a post or projection 46 extending from the inner central wall of the member 43 into the cylinder 40 and is in engagement with the piston 41. The spring 45 thus constitutes the bias for the piston 41. The helical post 47 is formed integrally with the member 43 and engages a slot or opening 48 formed in the end of a sleeve 50. The sleeve 50 is mounted so that it may reciprocate within the housing 34, and also so that it may rotate. In order to mount the sleeve 50 in this manner, a second sleeve 51 is mounted about the sleeve 50 within a bushing 52 secured to the housing 34 by a press fit. The sleeve 51 is provided with lugs or extensions 53 which engage the inner radial face of the bushing 52. In order to turn the sleeve 51 a knurled ring 54, which conforms to the stepped end of the bushing 52 and rotates thereon, is secured to the sleeve 51 by a press fit or in any other suitable manner so that the sleeve 51 is securely held on the bushing 52 and may rotate therein. The spring 45 rests against a washer 55 which is in face engagement with the lugs 53 and the inner end of the sleeve 51 and thus not only biases the member 43 to the right but also presses the lugs 53 against the end of the bushing 52. The sleeve 50 is provided with oppositely positioned lugs 56 near its center and extending outwardly into grooves formed as slots in the sleeve 51. These slots as shown in FIGS. 3 and 4 comprise two longitudinal slots 57 which extend parallel to the longitudinal axis of the cylinder 34 and two arcuate slots 58 near the left end of the sleeve 51 as viewed in FIG. 3.

Figure 5:
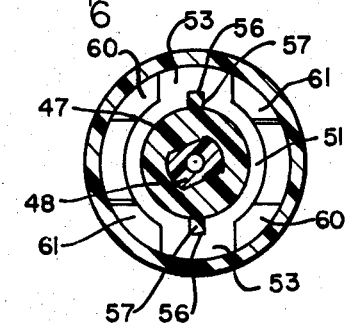
FIG. 5 is a sectional view taken along the line 5—5 of FIG. 3.

With the sleeve 50 in the position shown in FIGS. 3, 4 and 5, it is in engagement at its right end with the motion transmitting member 43 and when the motor is operated the sleeve 50 is reciprocated with the member 43, the lugs 56 moving in the longitudinal guides 57. In this position the sleeve 50 cannot move longitudinally with respect to the member 43 because neither the member 43 nor the sleeve 50 can rotate; thus the sleeve cannot ride out on the helical configuration of the post 47. As shown in FIG. 5, the bushing 52 is provided with arcuate stops 60 which are diametrically opposite one another, and, in the position shown, prevent rotation of the sleeve 51 in a counterclockwise direction so that the sleeve 50 is constrained to move in a longitudinal direction. If now the sleeve 51 is rotated away from the stops 60 in a clockwise direction as viewed in FIG. 5 the twisting force exerted on the post 47 will cause the sleeve 50 to move outwardly from the left as viewed in FIG. 3 until it reaches the end of the longitudinal slots and the lugs 56 are alined with the arcuate slots 58. In this position, when the motion transmitting member 43 is reciprocated the post 47 moves back and forth in the slot 48 in the end of the sleeve 50 and the sleeve thereby moves with rotary oscillating action. It is thus apparent that by moving the sleeve 51 from one position to the other it becomes possible to select alternatively either reciprocating or rotary oscillating movement of the brush. In order to hold the sleeve 51 positively in either of its positions slight axially extending ridges or arcuate raised portions 61 are provided in the end of the bushing 52 intermediate the stops 60. The lugs 53 on the sleeve 51 which are pressed against the bushing 52 by the spring 45 must pass over these ridges when moving from one position to the other between the stops 60. This provides a positive stop action and the user when turning the knurled collar 54 can feel the positive setting of the control in each end position thereof.

As clearly indicated in FIG. 6, the cylinder block 44 has diametrically opposite lateral extensions in which passages 42 are formed the upper one of these passages as viewed in FIG. 3 being in communication with the upper chamber of the valve assembly 38 through a port 62 in the valve assembly. The motion transmitting member 43 is of essentially the same configuration as the cylinder block 44 and fits closely about the block 44 in longitudinal sliding relationship. Thus motion transmitting member 42 is held against rotation.

The valve assembly 38 as clearly shown in FIG. 7 comprises a block 63 having a lower cylindrical chamber 64 and opposite ports 65 and 66 providing communication between the port 35 and the interior of the cylinder 40 through a port 67. An upper passage extending through the block 63 provides the port 62, and a valve stem 68 is slidably mounted in the block and provided with an operating knob 70 at the top. Leakage to the atmosphere is prevented by the an O-ring 71 of suitable synthetic plastic material. A valve 72 formed on the stem 68 is arranged to engage a port between the chamber 64 and the passage 62 and is held in this position whenever there is pressure in the chamber 64. During the admission of pressure pulses to the port 35 if the valve button 70 is pressed downwardly water is released through the valve and flows into the passage 42 and thence around the end of the cylinder block 44 and into the cylinder 40 to the left of the piston 41; from the cylinder the water flows through an opening 73 into a longitudinal passage 74 through the center of the post 47; thus water discharged from the valve assembly 68 flows outwardly and into the toothbrush passage where it may be released through a passage in the brush to an outlet near the bristles (not shown.) The valve thus provides an arrangement not only for purging the motor to initiate its operation but also to supply water to the bristles whenever the user desires.

Figure 8:
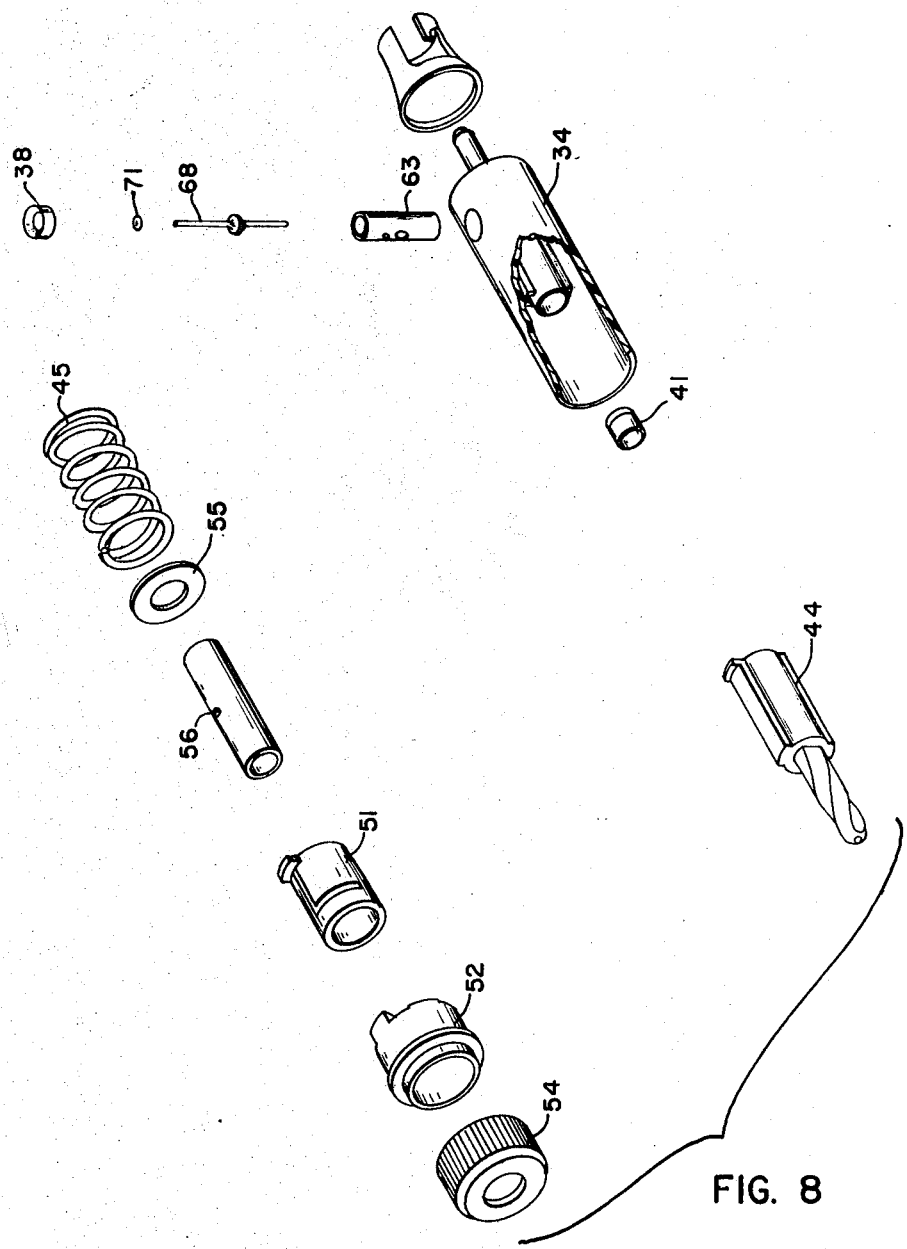
FIG. 8 is an exploded view showing the parts of the assembly of FIG. 3.

The opening in the end of the sleeve 50 about the post 47 is made to have a good sliding fit with the post and to minimize the passage of water therebetween. The water as it passes toward the brush is under low pressure and little if any water reaches the interior of the housing 34. At the same time the engaging surfaces of the post 47 and sleeve 50 receives sufficient water to facilitate the lubrication of these parts and the action of the motor driven assembly is smooth. The order of assembly of the parts of the toothbrush actuating mechanism is indicated by the exploded view FIG. 8.

From the foregoing, it is clear that this invention provides a quick and easily actuated control for shifting the movement of the toothbrush from reciprocating motion to oscillating rotary motion. The two positions of the shifting mechanism are illustrated in FIGS. 9 and 10. FIG. 9 shows the lug 56 of the sleeve 50 riding in the longitudinal slot 57 in the reciprocating motion position of the control. It will here be noted that the sleeve 50 rests against the end of the transmitting member 43. FIG. 10 illustrates the rotary oscillating motion position of the control, the lug 56 being shown in the arcuate slot 58. In the reciprocating position of FIG. 9 one lug 53 engages the upper edge of the stop 60 and in the position of FIG. 10 the other lug 53 engages the lower edge of the same stop 60. FIG. 9 thus shows the lugs 53 in their positions as shown in the cross sectional view, FIG. 5; and FIG. 10 shows the positions of these lugs when they are rotated clockwise as viewed in FIG. 5 until the lugs engage the opposite sides of the stops 60. It will also be noted in FIG. 10 that the sleeve 50 has moved outwardly from the sleeve 51 and away from the motion transmitting member 43 so that the post 47 is exposed between the sleeve and the member 43.

Figure 11:
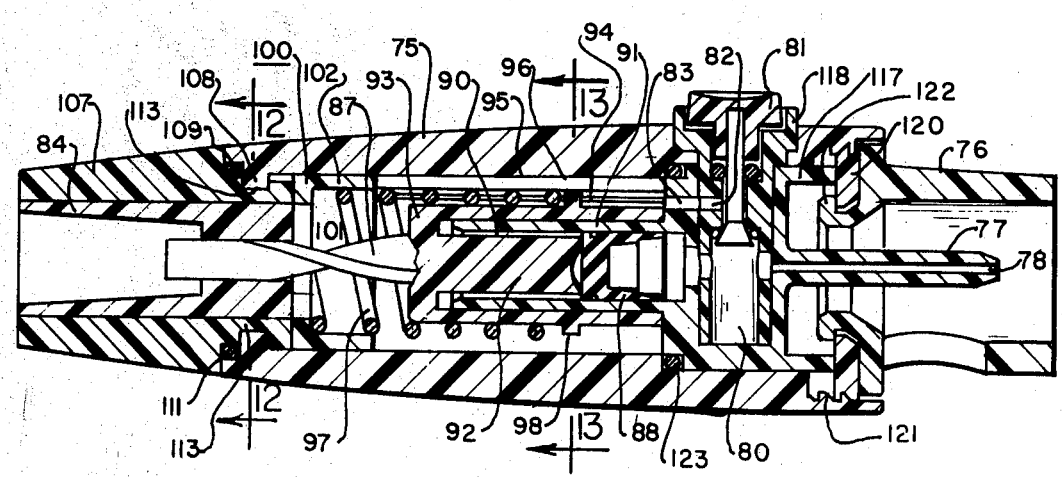
FIG. 11 is a longitudinal sectional view similar to FIG. 3 illustrating another embodiment of the invention.
Figure 12:
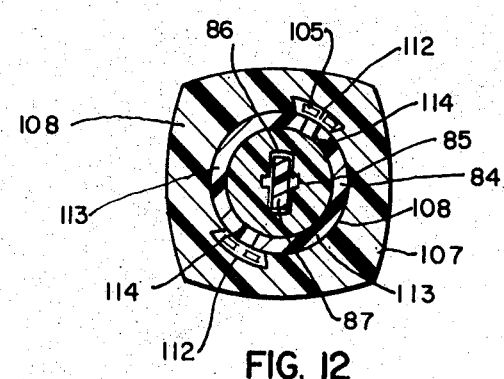
FIG. 12 is a sectional view taken along the line 12–12 of FIG. 11.
Figure 13:
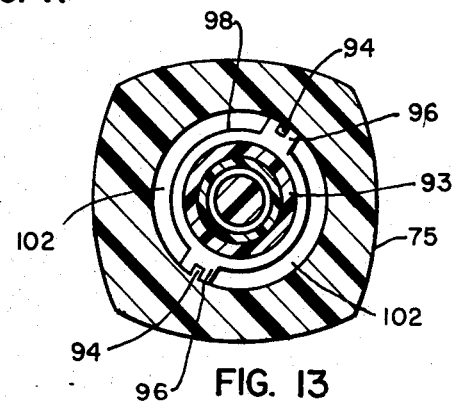
FIG. 13 is a sectional view taken along the line 13–13 of FIG. 11.

The second embodiment of the invention illustrated in FIGS. 11 through 16 is similar to the first embodiment and differs primarily in the structural features of the selector for determining the type of motion of the brush. As shown in FIGS. 11, 12 and 13, the toothbrush drive unit comprises a housing 75 of molded plastic and of a generally elongated tapered configuration with four curving sides in cross section as clearly shown in FIGS. 12 and 13. This unit includes a rotatable adapter 76 for receiving the fixture 13 of an oral hygiene appliance such as appliance 10 and arranged to deliver a pulsating stream through a nipple 77 having a passage 78 into a valve chamber 80 the chamber being essentially similar to the chamber 64 of the embodiment of FIG. 7. The valve actuated by a button 81 is provided to selectively discharge the liquid through a passage 82 to the interior of the housing through a passage 83 so that it passes around the motor assembly and out through a rotatable and slidable sleeve 84 through openings 85; these openings are shown in FIG. 2 on either side of a passage 86 which engages a helical post 87 in the same manner as the sleeve 50 engages the post 47 of FIG. 3. The piston indicated at 88 is freely movable in a cylinder 90 formed in a cylinder block 91 and the piston is biased to its right and or minimum volume position by a post 92 formed integrally with a motion transmitting member 93 of which the helical post 87 forms a part. Rotation of the motion transmitting member 93 is prevented by engagement between longitudinal guides 94 formed in the inner walls of a cylindrical passage 95 within the housing 75 and which are engaged by projections 96 on the member 93 which projections are provided with slots for engaging the guides 94. Motion transmitting member 93 is biased to its righthand position by compression spring 97 which engages a flange 98 on the member 93, the lugs 96 being formed integrally with the flange 98. The other end of the spring enters a retaining member 100 which comprises an internal ring 101 and two substantially cylindrical sleeve portions 102 which slidably engage the interior wall of the cylinder 95. The two cylindrical portions 102 are spaced about 180° from each other and provide guides for engagement with the guide ridges 94 to prevent rotation of the retainer 100. The configuration of retainer 100 is more clearly illustrated in FIG. 14 where the upper slot between the two cylindrical portions 102 is indicated at 104. Each of the sleeve portions 102 is provided with extensions adjacent the slots 104 as indicated at 105. The spring 97 thus urges the retainer 100 against the end of the sleeve 84, and the outer side of the retainer ring 101 engages oppositely positioned lugs 196 formed on the sleeve 104. These lugs correspond in function to the lugs 56 of the sleeve 50 of the first embodiment of the invention.

Alternate operation of the sleeve 84 to provide reciprocating and rotary oscillating movement of the toothbrush is effected by placing a selector member 107 in either of two positions of rotation. As shown in FIG. 11, the end of the housing 75 adjacent the selector 107 is formed to provide an inwardly extending annular shoulder member 108 and the member 107 is provided with a shoulder 109 which engages the shoulder 108 and provides an annular recess between the members to accommodate an O-ring gasket or seal 111. The shoulder 108 is formed in two arcuate portions separated by arcuate spaces 112 as shown in FIG. 12, and in the position of the parts illustrated in FIG. 11, the extensions 105 of the retainer 100 engage the outer faces of arcuate or annular shoulders 113 formed on the sleeve member 107 which is the selector device. Two opposite axial and radial arcuate extensions or lugs 110 are formed on the shoulder 113 and are of a configuration to pass through the openings 112 in the end wall of the housing 75; each of these openings is centered with a respective one of the guides 99. These axial extensions cooperate with the arcuate ends of the shoulders 113 and the outer end or face of the retainer ring 101 to form two arcuate guide spaces within which the lugs 106 of the sleeve 84 may move during rotary oscillation. In order to afford reciprocating movement of the sleeve 84 the inner wall of the selector sleeve 107 is formed to provide two longitudinal slots 114 in which the lugs 106 may reciprocate; these slots are centered with respect to the guide ribs 94 when the selector 107 is in its position for reciprocating action. For this purpose the extensions 105 are arranged to engage the lugs 110 when the slots 104 are centered with respect to the respective longitudinal slots 114.

Figure 15:
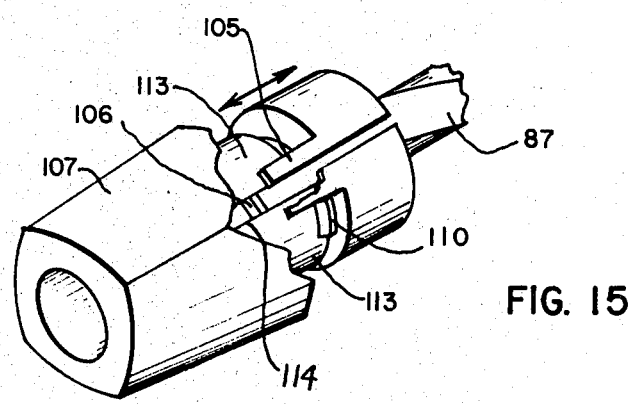
FIG. 15 is an enlarged view partly broken away to illustrate the reciprocating motion position of the toothbrush assembly of FIG. 11.

As noted above, the slots 104 engage the guide ribs 94 in the inner wall of the cylinder 95 and prevent rotation of the retaining member 100, it will now be apparent that rotation of the sleeve member 107 to select the type of motion for the sleeve 84 is limited to two positions determined by arcuate movement of the lugs on the sleeve 107. The retainer 100 is pressed against the lugs 110 by the spring 97 and in order to retain the sleeve 107 in its position at either end of the movement of the sleeve slightly raised portions 116 are formed on the retainer member 100 intermediate the arcuate portions between the extensions 105 of each cylindrical section 102. The longitudinal slots 114 lie adjacent one side of the lugs 110 on the selector 107 and when the lug 106 of the sleeve 84 is positioned against this stop the actuation of the motor will result in reciprocation of the brush, the lugs 106 riding in the slots 114 during reciprocating movement. This position of the parts is illustrated in FIG. 15. When the selector 107 is rotated to its other position as shown in FIG. 16 the lugs 106 are in the respective arcuate slots formed between the end of the sleeve 107 and the retainer 100 and reciprocation of the sleeve 84 is prevented; however, when the motor is actuated, the reciprocation of the helical post 87 produces rotary oscillating movement of the sleeve and this continues as long as the selector 107 is in the position of FIG. 16.

The movement of the selector between the positions of FIG. 15 and FIG. 16 may be made during operation of the device without stopping the motor so that the user is not required to stop the operation of the power supply unit 10 in order to change the mode of operation of the brush.

The configuration of the outside walls of the housing 75 and the selector 107, whereby four slightly curved surfaces are provided, facilitates the handling of the toothbrush mechanism and the ready shifting of the selector 107 to either of its positions.

During the assembly of the unit as shown in FIG. 11 the motion transmitting member 93 with the spring 97 and the retainer member 100 together with the sleeve 84 mounted thereon with the guide members 96 and 104 in alinement are introduced into the cylinder 95 from the right-hand end of the housing 75 as viewed in FIG. 11 and the guide members positioned on the guides 94. The cylinder block 91 includes an enlarged cylindrical member 117 in which the bore for the valve assembly is formed, and the nipple 77 also integrally formed therewith. This block is inserted in the housing 75 and the valve cylinder is alined with an opening 118 so that the valve assembly may be inserted and seated in its proper position. This prevents removal of the cylinder block 91. When the retainer assembly 100 is positioned on the guides 94 the extensions 105 pass through the opening 112 as indicated at FIG. 12 and the selector element 107 may now be positioned for insertion and installation in the cylinder of the housing 75. The selector 107 is positioned with the lugs 110 in alinement with the slots 112 and by pressing it forward to engage the extensions 105 and push the retainer member 102 back the stop members 110 pass through the opening 112, and, upon twisting of the selector 107, the stops move away from the extensions 105 which then snap back into the openings 112 and leave the selector locked in position so that it may be operated by movement back and forth between its two stop positions. In this manner the selector member 107 is secured in position and may not be removed until the assembly is removed through the right-hand end of the cylinder 75. The swivel connector 76 is attached by screwing a washer fitting 120 into position on threads formed within the end of the housing 75 as indicated at 121. This fitting 120 rotatably engages the fitting 76 which is retained in position by flanges 122 which are of relatively soft flexible plastic material and may be snapped into place to retain the assembly in position. During the assembly, the O-ring gasket 111 and an annular gasket of rectangular cross section indicated at 123 are both inserted to prevent leakage from the housing 75.

As indicated in the drawings the structural parts of both embodiments of the invention except the spring 97 are constructed of plastic materials. These materials are selected to provide the required characteristics, the housing or cylinder 75 and the selector 107 being of relatively rigid material and the working parts including the motion transmitting member 93 and the sleeve 84 also being of relatively rigid material and being selected so that there is relatively little friction between the sliding parts of the mechanism.

A wide range of plastic materials is available for constructing the components of both embodiments, and by way of example, acrylonitrile-butadiene styrene polymers may be employed for parts 34, 54, 75 and 107, acetal polymers for parts 36a and 76 and acetal homopolymers or acetal polymers impregnated with tetrafluorethylene (TFE) for parts 43, 44, 50, 84, 91 and 93. The free floating piston may for example be constructed from polyethylene.

Toothbrush assemblies constructed as illustrated in the two embodiments to this invention have been found highly effective in operation and have provided positive reciprocating and oscillating action of the toothbrush bristles.

We claim:

1. A motor driven toothbrush comprising a housing, a motion transmitting member slidably mounted in said housing, a motor in said housing for reciprocating said member, and means for connecting a toothbrush having a shaft to said motion transmitting member and for driving the shaft with back and forth movement, said means including a converter for changing the reciprocating movement of said member to oscillating movement of the shaft about the axis thereof, and selective control means movable into a first position for connecting said converter to produce oscillation of said shaft and into a second position for connecting said shaft to be driven directly by said member with reciprocating movement.

2. A motor driven toothbrush as set forth in claim 1 wherein said control means locks said converter out of operation in said second position.

3. A motor driven toothbrush as set forth in claim 1 including means for preventing rotation of said member and wherein said connecting means includes a second member rotatably and axially movable with respect to said transmitting member, one of said members having an axially alined helical post thereon and the other of said members closely engaging said post whereby relative axial movement of said members tends to produce relative rotation thereof, and said selective control comprising means movable into a first position for preventing relative rotation of said members while affording axial movement of said second member and into a second position for preventing axial movement of said second member while affording rotation thereof.

4. A motor driven toothbrush as set forth in claim 3 wherein said second member comprises an elongated cylindrical sleeve and said control means includes a second sleeve rotatable about said second member and movable between two angular positions with respect thereto, means for retaining said second sleeve in each of said two positions, a longitudinal guide in the wall of said second sleeve, a lug on said second member slidable in said guide, and means utilizing at least a portion of said second sleeve for providing a circumferential guide on said second sleeve opening into said first guide and extending partially around the wall of said second sleeve for affording relative rotational movement between said sleeves when said lug is positioned in said second guide, said second sleeve in its first of said positions holding said lug in said longitudinal guide and in its second position holding said lug in said circumferential guide.

5. A motor driven toothbrush as set forth in claim 4 wherein said second sleeve upon movement between said first and second positions turning said second member with respect to said transmitting member and utilizing said helical post to move said second member axially for positioning of said lug for movement in the respective ones of said guides.

6. A motor driven toothbrush as set forth in claim 4 including a third sleeve non-rotatably attached to said housing and positioned adjacent said second sleeve, said second sleeve being rotatable with respect to said third sleeve, a stop member on said second sleeve adjacent the inner end thereof and extending radially outwardly therefrom, said third sleeve having an annular recess for receiving said stop and the ends of said recess determining said first and second positions, and an axial extension on said third sleeve intermediate the ends of said recess and constituting said means for retaining said second sleeve in each of said two positions.

7. A motor driven toothbrush as set forth in claim 6 including compression spring means about said motion transmitting member and exerting pressure between said transmitting member and said third sleeve for biasing said transmitting member toward its retracted position and for urging said radially extending stop member and said axial extension into engagement with one another.

8. A motor driven toothbrush as set forth in claim 7 wherein said third sleeve is slidably mounted within said housing.

9. A motor driven toothbrush as set forth in claim 8 wherein a longitudinal guide is provided on the inner wall of said housing and wherein said motion transmitting member and said third sleeve include means engaging said longitudinal guide for preventing their rotation, and said third sleeve comprising a retaining ring engaging said spring on one side and said lug on the other and having cylindrical wall portions extending over said spring on one side and having extensions on the other side defining said annular recess for receiving said stop on said second sleeve, said cylindrical wall portions being spaced to provide said means on said third sleeve for engaging said longitudinal guide.

10. A motor driven toothbrush for use with an oral hygiene appliance of the type having an output fixture for delivering a stream of intermittent liquid pressure pulses comprising a housing and a toothbrush mounted thereon, a hydraulic motor of the expansible chamber type movable between minimum and maximum volume positions mounted in said housing, the mounting for said toothbrush comprising a sleeve rotatably mounted on said housing, a connecting member slidably and non-rotatably mounted within said housing, means for utilizing said motor for reciprocating said slidable member, said utilizing means including means for biasing said member and said motor toward the minimum volume position of said motor, a helical post on said member positioned for reciprocating movement with respect to said sleeve, a transverse wall on said sleeve having an opening of a configuration to receive said post for engaging said post and imparting oscillating movement to said sleeve upon reciprocation of said post, means for connecting the stream discharge fixture of an intermittent liquid pressure appliance to said housing with the output thereof in closed communication with said expansible chamber motor, said post having a longitudinal passage therein opening into said sleeve at its outer end, means providing a passage around said motor for bypassing said motor and discharging the bypassed liquid into said passage in said post, and valve means for controlling the admission of liquid to said bypass passage.

References Cited
UNITED STATES PATENTS

| | | | |
|---|---|---|---|
| 2,799,035 | 7/1957 | Pfluger | 15—22 |
| 2,858,701 | 11/1958 | Willcox | 15—22UX |
| 3,484,885 | 12/1969 | Deines et al. | 15—27 |

EDWARD L. ROBERTS, Primary Examiner

U.S. Cl. X.R.

60—54.5; 74—89.15; 128—62